United States Patent [19]
Karp

[11] Patent Number: 5,324,238
[45] Date of Patent: Jun. 28, 1994

[54] NON-UNIFORM TORQUE TRANSMITTING MECHANISMS SUCH AS BICYCLE CHAINWHEEL SETS

[76] Inventor: Stefan Karp, 37 Glenfield Road, Luton-Beds LU32HZ, United Kingdom

[21] Appl. No.: 978,691
[22] PCT Filed: Aug. 5, 1991
[86] PCT No.: PCT/GB91/01334
§ 371 Date: Jan. 22, 1993
§ 102(e) Date: Jan. 22, 1993
[87] PCT Pub. No.: WO92/02404
PCT Pub. Date: Feb. 20, 1992

[30] Foreign Application Priority Data
Aug. 6, 1990 [GB] United Kingdom ............ 9017226
Aug. 6, 1991 [CN] China ............ 91105411.1
Aug. 6, 1991 [IN] India ............ 593CAL/91

[51] Int. Cl.$^5$ ............ F16H 9/00
[52] U.S. Cl. ............ 474/152; 474/160
[58] Field of Search ............ 474/152, 153, 160, 77, 474/78

[56] References Cited
U.S. PATENT DOCUMENTS
4,044,621 8/1977 McGregor, Sr. et al. ..... 474/160 X
4,475,894 10/1984 Sugino ............ 474/160 X
5,194,051 3/1993 Nagano ............ 474/160

*Primary Examiner*—Thuy M. Bui
*Attorney, Agent, or Firm*—Harrison & Egbert

[57] ABSTRACT

A crank, 14, driven wheel from a central boss, 20, to an outter rim, 22, via ribs, 12 (12a or 12b), transmitting slightly improved torque to a chain (belt, rope or similar), 16, via chain wheel teeth, 10 (in this example), able to store some elastic energy in the ribs, 12, (12a or 12b), when crank, 14, transmits maximum torque (around the horizontal position) and releasing it to the rim, 22, (hence to chain, belt, rope or similar, 16,) when crank, 14, transmits least torque (around vertical positions) and having an additional ability of small elastic deformation in response to slight misalignment of the line of force offered to the rim, 22, by chain (belt, rope or similar), 16.

15 Claims, 1 Drawing Sheet

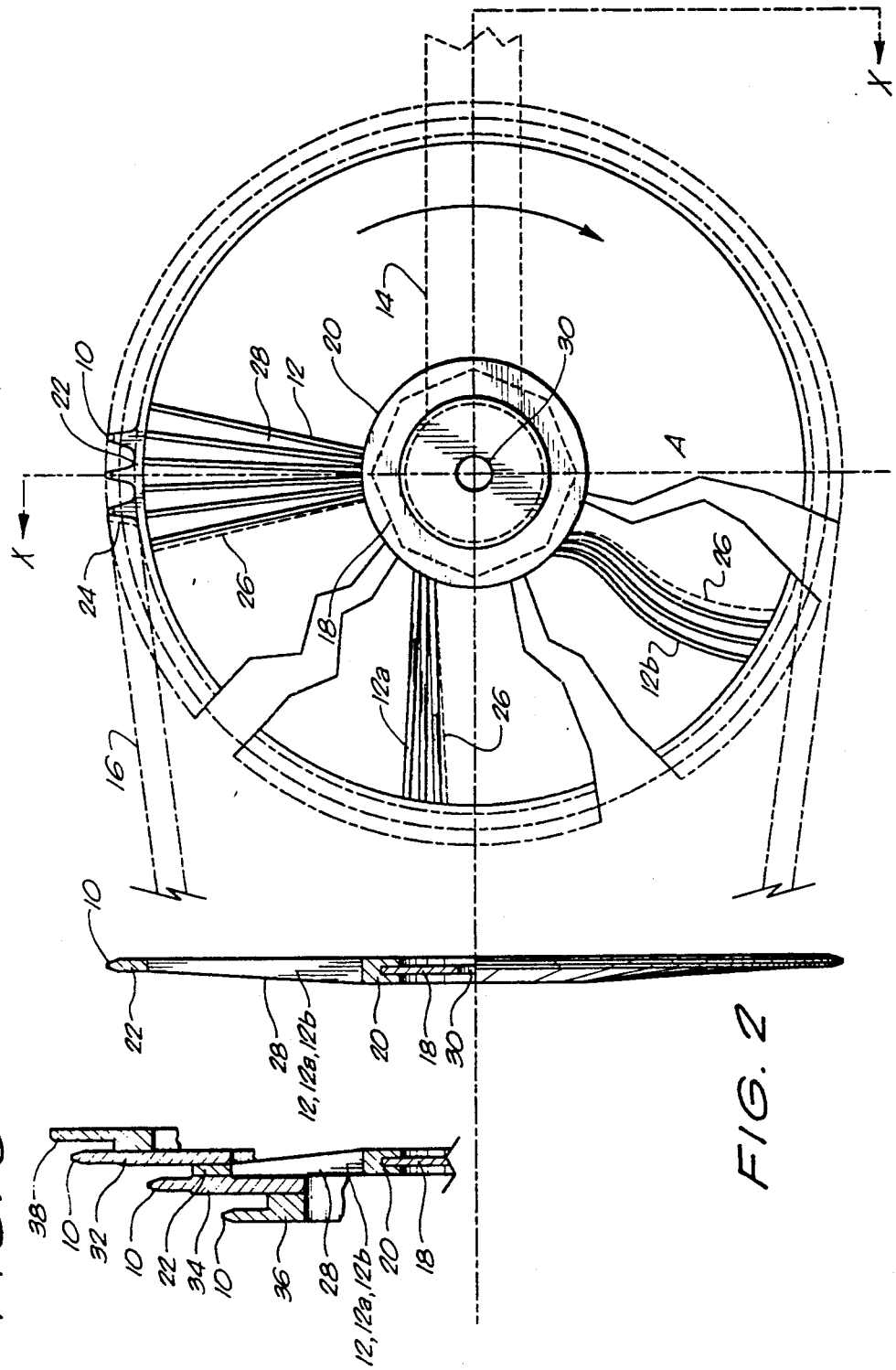

NON-UNIFORM TORQUE TRANSMITTING MECHANISMS SUCH AS BICYCLE CHAINWHEEL SETS

This invention relates to mechanisms not capable to transmit uniform torque due to restriction imposed by the kinematic systems employed.

A classical example of such a system is the chainwheel of a bicycle with its left and right cranks and their pedals.

Each pedal subjected to a vertical downwards force applies a torque at the centre of rotation of the crank which varies in magnitude from a maximum value when the crank is horizontal to ZERO when the crank is vertical.

Conventional transfer of this non-uniform torque from the crank to the rear bicycle wheel is via a chainwheel to the rear bicycle wheel. This latter chainwheel has the ability of transmitting the received torque only clockwise and is thus called a freewheel as it does not transmit torque in the anti-clockwise direction.

This non-uniform torque is transmitted to the chainwheel twice for every complete rotation of cranks. The right crank during the first 180° or last half a turn.

This invention minimises the torque non-uniformity by receiving and temporarily storing circumferential elastic energy in the chainwheel when each crank delivers significant torque, energy which is almost immediately given back to the chainwheel rim at the time when the cranks deliver the least torque.

According to the invention a torque transmitting wheel comprising an inner ring and an outer ring and a plurality of angular spaced elastically deformable ribs, each rib being arranged such that one end is connected to the inner ring and the other end is connected to the outer ring, only said ribs providing support between said rings, said ribs allowing the outer ring to rotate relative to the inner ring when torque is transmitted by the wheel.

Such embodiment receives and temporarily stores a circumferential deformation hence energy, when cranks deliver large torque and give back most of the same energy as torque to the chainwheel rim when cranks deliver small torque.

Extending the use of the selected polymer to almost the entire chainwheel adds advantages such as: load is shared by more chainwheel teeth than in the case of metal chainwheels; a significant weight saving; no corrosion protection; no lubrication required; kinder to the chain; built in chainguards; generous choice of colours hence aesthetically pleasant yet remaining technically and commercially competitive.

The invention will now be described in more details by way of example with reference to the drawings, in which:

FIG. 1 is a front view of the chainwheel showing only few teeth 10, and radial ribs 12, 12a and 12b, of the chainwheel (standard engineering drawing practice).

FIG. 2 is a side view of FIG. 1 with the upper half in section (Section X—X).

FIG. 3 is part side view of a three chainwheel set in which the chainwheel teeth 10, are attachable permanently or temporarily to the chainwheel rim 22, via chainwheel rings 32, 34, and 36, directly or indirectly. It also shows the chainguard 38 attachable permanently or temporarily to the largest chainwheel ring.

In FIG. 1 crank 14, is shown in the position where it can deliver the maximum torque to chain 16 via central metal plate 18, chainwheel boss 20, radial ribs 12, 12a, and 12b, chainwheel rim 22, and chainwheel teeth 10. The choice of radial ribs geometry 12, 12a, and 12b, will depend upon loading of chainwheels, materials and processes of manufacturing available and user preference, to some extent.

Chainwheel rim 22, may have the chainwheel teeth 10, integral with itself as in FIG. 1 and FIG. 2, where a single chainwheel without chainwheel guard is shown or attachable to itself as shown in FIG. 3 that refers to multi-chainwheel embodiments.

Dotted lines 24 and 26, show grossly exaggerated the positions the teeth 10, and ribs 12, 12a, and 12b, would take respectively during riding of the bicycle.

This position is well within the elastic limit of the material hence by the time the crank 14 reaches the vertical position A, the elastically displaced chain teeth 10 and radial ribs 12, 12a and 12b would have returned to their unloaded normal positions. For this to take place a clockwise torque has acted on the chain 16 supporting the crank 14, which was during the stage of losing torque rapidly to ZERO.

From FIG. 2 it can be seen that the depth of radial ribs 12, 12a and 12b increase uniformally until they reach the same depth as that of the chainwheel boss 20, that the central metal plate 18 is moulded integrally with the chainwheel as an insert and that there is no polymer at all in the space 28 between adjacent ribs 12, 12a and 12b.

From FIG. 3 it can be seen that the multiple chainwheel sets are employing almost identical radial ribs 12, 12a and 12b as the single chainwheel shown in FIG. 1 and FIG. 2 to improve the applied torque characteristics. It also shows chainguard 38 attached to the largest chainwheel from the set 32 attachment which can be similarly made in the case of single chainwheel also.

For economical manufacture the central metal plate, 18, will have a small pilot hole 30 until it is known with what configuration of crank is to be joined.

A single or multiple chainwheel set designed and manufactured to this invention should improve the torque transmitting characteristics of such mechanisms.

I claim:

1. A torque transmitting wheel comprising an inner ring and an outer ring and a plurality of angular spaced elastically deformable ribs, each rib being arranged such that one end is connected to the inner ring and the other end is connected to the outer ring, only said ribs providing support between said rings, said ribs allowing the outer ring to rotate relative to the inner ring when torque is transmitted by the said ribs are cross.

2. A torque transmitting wheel as claimed in claim 1 wherein the ribs are integrally formed with either or both of said rings.

3. A torque transmitting wheel as claimed in claim 1 wherein the ribs extend radially from the inner ring.

4. A torque transmitting wheel as claimed in claim 1 wherein the ribs extend tangentially to a reference circle of equal or lesser or diameter than, and concentric with, the inner ring.

5. A torque transmitting wheel comprising an inner ring and an outer ring and a plurality of angular spaced elastically deformable ribs, each rib being arranged such that one end is connected to the inner ring and the other end is connected to the outer ring, only said ribs providing support between said rings, said ribs allowing the outer ring to rotate relative to the inner ring when torque is transmitted by the wheel, said ribs are S-shaped.

6. A torque transmitting wheel as claimed in claim 1 wherein the flexibility of the ribs is such that an axis of the outer ring can deflect at an angle relative to an axis of the inner ring.

7. A torque transmitting wheel as claimed in claim 1 wherein the wheel is a chainwheel.

8. A torque transmitting wheel as claimed in claim 7 wherein teeth are integrally formed with the outer ring.

9. A torque transmitting wheel as claimed in claim 7 wherein further sets of teeth are mounted on the side of the outer ring.

10. A torque transmitting wheel as claimed in any of claim 7 wherein the chainwheel is for a bicycle.

11. A torque transmitting wheel as claimed in claim 10 wherein a chain guard is attached to the outer ring.

12. A torque transmitting wheel as claimed in claim 11 wherein the chain guard is integrally formed with the outer ring.

13. A torque transmitting wheel as claimed in claim 1 wherein the ribs are formed of a polymer.

14. A torque transmitting wheel as claimed in claim 1 wherein either of the rings is formed of a polymer.

15. A torque transmitting wheel as claimed in claim 7 wherein the entire chainwheel is formed of a polymer.

* * * * *